(12) United States Patent
Oudin et al.

(10) Patent No.: US 9,260,196 B2
(45) Date of Patent: Feb. 16, 2016

(54) METHOD AND DEVICE FOR DISPLAYING IN REAL TIME A PITCH INSTRUCTION ON AN AIRCRAFT DURING MANUAL PILOTING

(71) Applicant: Airbus Operations (SAS), Toulouse (FR)

(72) Inventors: Simon Oudin, Toulouse (FR); Guilhem Puyou, Toulouse (FR); Jean Muller, Tournefeuille (FR); Lilian Ronceray, La Salvetat St. Gilles (FR)

(73) Assignee: AIRBUS OPERATIONS (SAS) Toulouse (FR)

( * ) Notice: Subject to any disclaimer, the term of this patent is extended or adjusted under 35 U.S.C. 154(b) by 5 days.

(21) Appl. No.: 14/327,213

(22) Filed: Jul. 9, 2014

(65) Prior Publication Data

US 2015/0019050 A1    Jan. 15, 2015

(30) Foreign Application Priority Data

Jul. 12, 2013    (FR) ...................................... 13 56861

(51) Int. Cl.
| | |
|---|---|
| *G05D 1/00* | (2006.01) |
| *G05D 1/08* | (2006.01) |
| *G05D 3/00* | (2006.01) |
| *B64D 43/00* | (2006.01) |
| *G01C 23/00* | (2006.01) |
| *G01C 5/00* | (2006.01) |
| *G01C 21/16* | (2006.01) |

(52) U.S. Cl.
CPC .............. *B64D 43/00* (2013.01); *G01C 23/005* (2013.01); *G01C 5/005* (2013.01); *G01C 21/16* (2013.01)

(58) Field of Classification Search
USPC .......... 701/3–4, 14, 15–16, 18; 340/945, 971, 340/975, 974; 700/83, 85; 244/180, 175
See application file for complete search history.

(56) References Cited

U.S. PATENT DOCUMENTS

| | | | | |
|---|---|---|---|---|
| 2,925,667 A | * | 2/1960 | Fogarty ................. | G09B 9/206 235/109 |
| 3,135,955 A | * | 6/1964 | Brainin ..................... | F41G 5/18 244/177 |
| 3,439,105 A | * | 4/1969 | Ebeling ................. | G01C 11/00 348/E3.052 |
| 3,497,870 A | * | 2/1970 | Balding ................. | G01C 23/00 340/973 |
| 3,691,356 A | * | 9/1972 | Miller .................. | G05D 1/0661 244/181 |
| 4,071,893 A | * | 1/1978 | Sicre ........................ | G06G 7/78 244/181 |
| 4,095,271 A | * | 6/1978 | Muller ................... | G01C 9/005 244/181 |

(Continued)

FOREIGN PATENT DOCUMENTS

| | | | | | |
|---|---|---|---|---|---|
| CN | 104281149 A | * | 1/2015 | .......... | G01C 23/005 |
| FR | 3008499 B1 | * | 8/2015 | ............. | B64D 43/00 |
| WO | 2008003591 | | 1/2008 | | |

OTHER PUBLICATIONS

Singh et al, Ultimate Boundedness Control of Uncertain Systems with Application to Roll Coupled Aircraft Maneuver, Proceedings of the 28th IEEE Conference on Decision and Control, 1989, pp. 1708-1713.*

(Continued)

*Primary Examiner* — Cuong H Nguyen

(57) ABSTRACT

A device comprising a display unit which is configured to display, on a screen of the cockpit of the aircraft, a pitch bar illustrating a pitch order and means for adapting the direct gain of the pitch law used to the effective manual behavior of the pilot in order to obtain a homogeneous response from the aircraft.

9 Claims, 2 Drawing Sheets

(56) References Cited

U.S. PATENT DOCUMENTS

| | | | | | |
|---|---|---|---|---|---|
| 4,241,519 | A | * | 12/1980 | Gilson | G09B 9/302 348/257 |
| 4,454,496 | A | * | 6/1984 | Lowe | 340/980 |
| 4,554,545 | A | * | 11/1985 | Lowe | 340/980 |
| 4,697,986 | A | * | 10/1987 | David | B64C 27/72 416/114 |
| 5,850,624 | A | * | 12/1998 | Gard | G01R 33/0206 33/356 |
| 6,745,113 | B2 | * | 6/2004 | Griffin, III | G01D 7/04 340/971 |
| 8,380,473 | B2 | * | 2/2013 | Falangas | 703/8 |
| 8,706,460 | B2 | * | 4/2014 | Falangas | 703/8 |
| 8,744,738 | B2 | * | 6/2014 | Bushnell | 701/122 |
| 2003/0229426 | A1 | * | 12/2003 | Griffin, III | G01D 7/04 701/3 |
| 2006/0212182 | A1 | * | 9/2006 | Shaw | 701/12 |
| 2009/0287365 | A1 | | 11/2009 | Riedinger | |
| 2012/0209457 | A1 | * | 8/2012 | Bushnell | 701/13 |

OTHER PUBLICATIONS

Stiharu-Alexe et al, On the Robust Control of Aeroelastic Vehicles, IEEE American Control Conference, 1994, pp. 696-700.*

Lyshevski et al, High-Performance Direct-Drive Flight Actuators: Advanced Technology Demonstration, Proceedings of the 1999 IEEE International Conference on Control Applications, 1999, pp. 1229-1234.*

Airborne ultrasonic phased arrays using ferroelectrets: a new fabrication approach; Ealo, J.L.; Camacho, J.J.; Fritsch, C. Ultrasonics, Ferroelectrics, and Frequency Control, IEEE Transactions on; Year: 2009, vol. 56, Issue: 4; pp. 848-858, DOI: 10.1109/TUFFC.2009.1108.*

A multi-gain sliding mode based controller for the pitch angle control of a civil aircraft; Polas, M.; Fekih, A.; System Theory (SSST), 2010 42nd Southeastern Symposium on; Year: 2010; pp. 96-101, DOI: 10.1109/SSST.2010.5442854.*

Digital controller design for the pitch axis of the F-14 using an H∞ method; Jiann-Shiou Yang; Levine, W.S.; Decision and Control, 1989., Proceedings of the 28th IEEE Conference on; Year: 1989; pp. 2325-2330 vol. 3, DOI: 10.1109/CDC.1989.70589.*

An energy management display for general aviation safety enhancements; Adami, T.M.; Uijt de Haag, M.; Theunissen, E.; Sizoo, D.; McGuire, R.; Digital Avionics Systems Conference (DASC), 2014 IEEE/AIAA 33rd; Year: 2014 ; pp. 2D1-1-2D1-11, DOI: 10.1109/DASC.2014.6979430.*

Steering and horizontal motion control in insect-inspired flapping-wing MAVs: The tunable impedance approach; Mahjoubi, H.; Byl, K.; American Control Conference (ACC), 2012; Year: 2012; pp. 901-908, DOI: 10.1109/ACC.2012.6314655.*

Analysis of a tunable impedance method for practical control of insect-inspired flapping-wing MAVs; Mahjoubi, H.; Byl, K. Decision and Control and European Control Conference (CDC-ECC), 2011 50th IEEE Conference on; Year: 2011; pp. 3539-3546, DOI: 10.1109/CDC.2011.6160297.*

Real time vision for intelligent vehicles; Gavrila, D.M. et al; Instrumentation & Measurement Magazine, IEEE; Year: 2001, vol. 4, Issue: 2;pp. 22-27, DOI: 10.1109/5289.930982; IEEE Journals & Magazines.*

French Search Report, May 13, 2014.

* cited by examiner

METHOD AND DEVICE FOR DISPLAYING IN REAL TIME A PITCH INSTRUCTION ON AN AIRCRAFT DURING MANUAL PILOTING

CROSS-REFERENCES TO RELATED APPLICATIONS

This application claims the benefit of the French patent application No 1356861 filed on Jul. 12, 2013, the entire disclosures of which are incorporated herein by way of reference.

BACKGROUND OF THE INVENTION

The present invention relates to a method and a device for displaying in real time a pitch instruction on an aircraft, in particular a transport airplane, during piloting in manual mode.

The invention relates to the field of flight control systems and provides adaptation in real time for the calculation of values of the flight director of the FD type.

In modern aircraft, the flight director generally displays steering orders on primary flight screens of the PFD type (Primary Flight Display) and in a similar manner on HUD type displays (Head-Up Display). These steering orders are calculated by steering control laws based on selected steering targets in an FMS type system (Flight Management System) or directly on an FCU type unit (Flight Control Unit). If no automatic pilot system of the aircraft is engaged, the crew can manually pilot the aircraft by following the orders of the flight director and by manually carrying out the piloting that the automatic pilot system would carry out if it were engaged.

On the flight detector, a pitch bar and a roll bar indicate, respectively, the pitch and roll steering orders. The aircraft follows these steering orders when it is piloted in such a manner that these instruction bars of the flight director are centered on the attitude of the aircraft (generally illustrated at the center of the PFD/HUD display when a vertical mode is engaged in flight).

Generally, the pitch law relating to the PFD screen is controlled so as to withstand the variations in behavior of the pilot. Consequently, the response of the aircraft to the manual inputs of the pilot is not ideal since each pilot has his own operating dynamic (resulting from personal biological dynamics) when he follows a pitch bar displayed on the flight director.

That is to say, for the same pitch steering order (which is provided via the pitch instruction bar), the actuation of the pitch control handle, for example, a mini-handle, may have a different dynamic in accordance with the pilot operating it, or with the manner in which the same pilot carries out the actuation. The response of the aircraft may thus be different to that which it would be if the automatic pilot system were engaged and applied the pitch order automatically and precisely.

SUMMARY OF THE INVENTION

An object of the present invention is to overcome this disadvantage. It relates to a method for displaying in real time a pitch instruction on an aircraft during piloting in manual mode which allows a homogeneous response to be obtained from the aircraft (for the same pitch order) regardless of the behavior of the pilot activating the pitch control handle.

To this end, according to the invention, the method of the type comprising:
a first step of calculating a pitch steering order which is referred to as a pitch order, from a value dependent on an estimated load factor of the aircraft and a load factor order, to which value a gain is applied; and
a step of displaying, on a screen of the cockpit of the aircraft, a pitch bar which illustrates the pitch order,
is remarkable in that it further comprises:
a step of acquiring, in real time, a deviation angle of the pitch bar and a corresponding deflection angle of a pitch control handle which is activated manually by a pilot and which illustrates the operating dynamic of the pilot;
a second step of calculating a corrective term using the deviation and deflection angles; and
a third step of calculating a corrected direct gain based on the corrective term, the corrected direct gain being used at the first calculation step (in place of the gain) in order to calculate the pitch order used for the display of the pitch bar.

In this manner, owing to the invention, the gain of the pitch law used (that is to say, a conventional flight director law) is adapted, via the corrected direct gain, to the effective manual behavior of the pilot (that is to say, to the personal biological dynamics of the pilot) during activation of the control handle. This allows a homogeneous (and corresponding) response to be obtained from the aircraft (for the same pitch order), in spite of the wide variety of possible behaviors of the pilot.

Furthermore, the method may comprise at least some of the following features, taken individually or in combination:
the second calculation step comprises:
a first sub-step of estimating two auxiliary gains, illustrating the operating dynamic of the pilot, the auxiliary gains being estimated using the deviation angle of the pitch bar and the corresponding deflection angle of the pitch control handle activated manually by the pilot; and
a second sub-step of calculating the corrective term using the auxiliary gains;
the auxiliary gains are such that, by applying them to a deviation angle of the pitch bar in accordance with a mathematical model of the behavior of the pilot, the corresponding deflection angle of the pitch control handle is obtained;
the first sub-step comprises the implementation of a Least Squares method;
the second sub-step comprises operations involving:
determining a first term by applying processing operations to a first of the auxiliary gains;
determining a second term by applying processing operations to the second of the auxiliary gains;
calculating the sum of the first and second terms; and
applying an adjustable gain to this sum and, where applicable, limiting the corresponding value, in order to obtain the corrective term; and
the corrected gain $KDc$ is calculated, at the third calculation step, using the following expression:

$$KDc = CD \cdot KD$$

where:
CD is the corrective term; and
KD is a direct gain.

The present invention also relates to a device for displaying in real time a pitch instruction on an aircraft during piloting of the aircraft in manual mode.

According to the invention, the device of the type comprising:
a first calculation unit which is configured to calculate a pitch steering order, referred to as a pitch order, from a value which is dependent on an estimated load factor of the aircraft and a load factor order, to which value a gain is applied; and a display unit which is configured to display, on a screen of the cockpit of the aircraft, a pitch bar which illustrates the pitch order, is remarkable in that it further comprises:

an acquisition unit which is configured to acquire, in real time, a deviation angle of the pitch bar and a corresponding deflection angle of a pitch control handle which is activated manually by a pilot, illustrating the operating dynamic of the pilot;

a second calculation unit which is configured to calculate a corrective term using the deviation and deflection angles; and a third calculation unit which is configured to calculate a direct gain which is corrected on the basis of the corrective term. This corrected direct gain is used by the first calculation unit in order to calculate the pitch order.

The present invention also relates to a flight director of an aircraft, which comprises a display device such as that set out above.

The present invention further relates to an aircraft, in particular a transport airplane, which is provided with such a display device and/or such a flight director.

BRIEF DESCRIPTION OF THE DRAWINGS

The Figures of the appended drawings will provide a good understanding of how the invention can be implemented. In these Figures, reference numerals which are identical refer to elements which are similar.

DETAILED DESCRIPTION OF THE PREFERRED EMBODIMENTS

Figure 1:
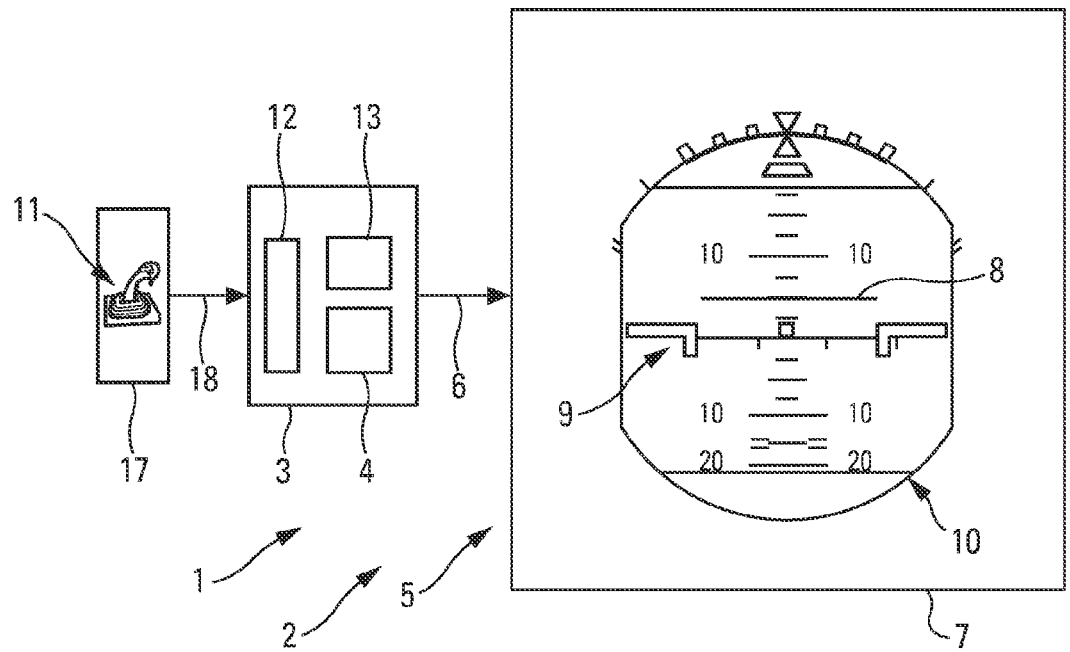
FIG. 1 is a block diagram of a device which illustrates an embodiment of the invention.

The device 1 which is schematically illustrated in FIG. 1 and which allows the invention to be illustrated is intended to automatically display, in real time, a pitch instruction on an aircraft (not illustrated), in particular a transport airplane, during manual piloting of the aircraft.

In a preferred embodiment, this display device 1 is part of a flight director 2 of the aircraft.

The display device 1 which is on-board the aircraft comprises, in particular, as illustrated in FIG. 1:

a data-processing unit 3 which comprises a calculation unit 4 in order to calculate a pitch steering order which is referred to as a pitch order, from a value VO which is dependent on an estimated load factor Nzest of the aircraft and a load factor order Nzc, to which value V0 a gain is applied; and a display unit 5 which is connected via a connection 6 to the data-processing unit 3 and which is configured to display on a screen 7 of the cockpit of the aircraft a pitch bar 8 which illustrates the pitch order.

In a preferred embodiment, the display unit 5 comprises a primary flight screen 7 of the PFD type (Primary Flight Display). It may also comprise a HUD type display (Head-Up Display) in order to display the pitch steering order (via the pitch bar 8) and other conventional steering orders. These steering orders are calculated by steering control laws which are based on selected steering targets in an FMS type system (Flight Management System), or an FCU type unit (Flight Control Unit). If no automatic pilot system is engaged, the crew can manually pilot the aircraft by following the orders displayed in particular on the screen 7.

On the screen 7 (of the flight director 2), the pitch bar 8 therefore indicates the pitch steering order and the aircraft follows this steering order when it is piloted in such a manner that the pitch bar 8 is centered on the attitude of the aircraft (generally illustrated at the center by a conventional indicator 9, as illustrated in FIG. 1). In a preferred embodiment, the display unit 5 is configured so that the pitch bar 8 is displayed on the screen 7 when a vertical mode is engaged during flight. On this conventional screen 7 there is also illustrated, in particular, a pitch scale 10.

According to the invention, the display device 1 further comprises, preferably in the data-processing unit 3, as illustrated in FIG. 1:

an acquisition unit 12 which is configured to acquire, in real time:

a deviation angle $\Delta\Theta$ of the pitch bar 8; and a deflection angle $\delta q$ of a conventional pitch control handle 11 (in particular a mini-handle) which has been activated manually by a pilot in response to the pitch control order corresponding to the deviation angle $\Delta\Theta$ (as presented to the pilot on the screen 7 via the pitch bar 8); and;

a calculation module 13 which is intended to calculate a corrected direct gain KDc.

Figure 2:
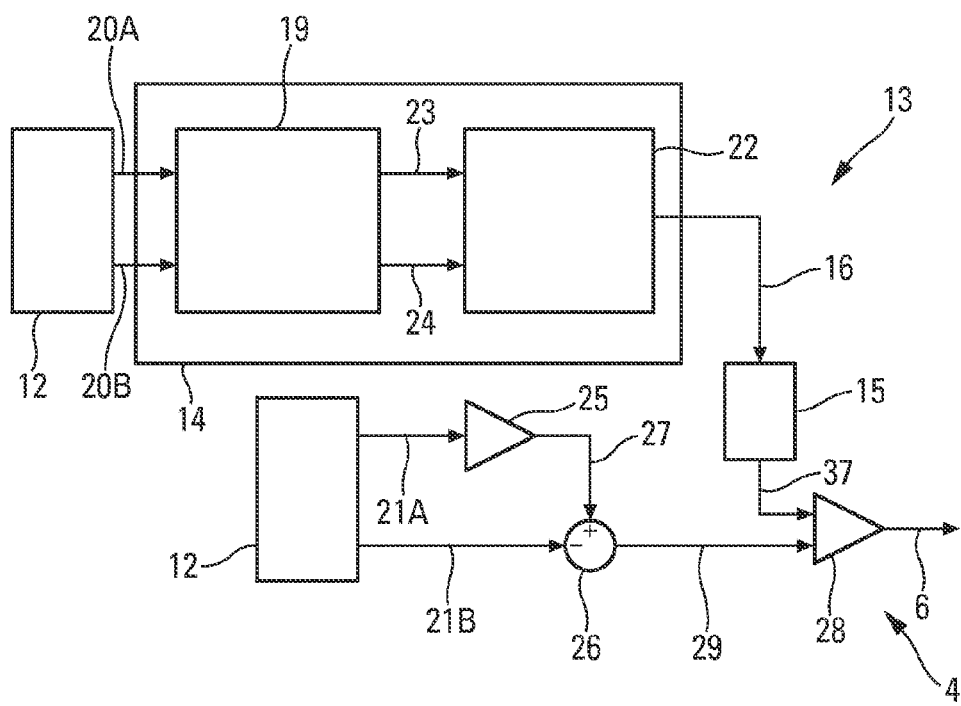
FIG. 2 is a block diagram of a calculation unit of a display device relating to the invention.

This calculation module 13 comprises, as illustrated in FIG. 2:

a calculation unit 14 which is configured to calculate a corrective term CD using the deviation angle $\Delta\Theta$ and the deflection angle $\delta q$ which illustrate the operating dynamic of the pilot; and a calculation unit 15 which is configured to calculate the corrected direct gain KDc from the corrective term CD received via a connection 16 of the calculation unit 14 and a direct gain KD.

The corrected direct gain KDc is used by the calculation unit 4 in place of the direct gain KD (determined in a conventional manner) in order to calculate the pitch order which is transmitted via the connection 6 to the display unit 5.

The calculation unit 15 calculates the corrected gain KDc using the following expression:

$$KDc = CD \cdot KD$$

In this manner, the display device 1 adapts the direct gain of the pitch law used (that is to say, a conventional flight director law), via the corrected direct gain KDc, to the effective manual behavior of the pilot (that is to say, to the personal biological dynamics of the pilot). This allows a homogeneous (and corresponding) response to be obtained from the aircraft (for the same pitch order), in spite of the significant variety of possible behaviors of the pilot.

The device 1 also comprises an assembly 17 of conventional information sources, which is connected via a connection 18 to the processing unit 3 and which provides the parameter values ($\Delta\Theta$, $\delta q$, Nzest, Nzc), which the acquisition unit 12 acquires.

Furthermore, the calculation unit 14 comprises:

an estimation unit 19 for estimating two auxiliary gains Kg and Kr which are set out below and which illustrate the operating dynamic of the pilot, using the corresponding deviation angle $\Delta\Theta$ of the pitch bar 8 and deflection angle $\delta q$ of the pitch control handle 11 which is activated manually by the pilot, which are received from the acquisition unit 12 via connections 20A and 20B, respectively; and a calculation element 22 for calculating the corrective term CD, using the auxiliary gains Kg and Kr which are received from the estimation unit 19 via connections 23 and 24, respectively.

Furthermore, as illustrated in FIG. 2, the calculation unit 4 comprises in particular:

a calculation element 25 which multiplies the estimated load factor Nzest (received via a connection 21A from the acquisition unit 12) by a conventional gain Knz which is dependent on the air speed of the type CAS;

a calculation element 26 which calculates the difference (referred to as the value VO above) between the product received via a connection 27 of the calculation element 25 and the load factor order Nzc received via a connection 21B from the acquisition unit 12; and a calculation element 28 which multiplies the result (value VO) received from the calculation element 26 via a connection 29, by the corrected direct gain KDc received from the calculation element 15 via a connection 37.

Thus, in a definitive manner, the pitch order provided at the output of the calculation element 28 is obtained by multiplication of the value VO (received from the calculation element 26) by the corrected direct gain KDc (with KDc=CD·KD).

The gains of the conventional pitch law are therefore adapted to the pilot as follows:

Knz remains unchanged;

KD is updated using the correction (and becomes KDc).

The adaptation of the gains of the pitch law implemented by the device 1 is intended to ensure that each pilot reproduces precisely the orders defined by the system.

The behavior of the pilot is determined by the two auxiliary gains Kg and Kr, that is to say, a direct gain Kg generally illustrating the flexibility and the amplitude of the operation of the pilot and a derived gain Kr which generally illustrates the reactivity of the pilot. These gains are different for each pilot. They are estimated by the estimation unit 19 in the manner set out below.

The auxiliary gains Kg and Kr are such that, by applying them to a deviation angle $\Delta\Theta$ of the pitch bar 8, in accordance with a mathematical model 30 for behavior of the pilot (illustrated in FIG. 3), the deflection angle $\delta q$ of the control handle 11 is obtained in the state as effectively generated by the pilot.

Figure 3:
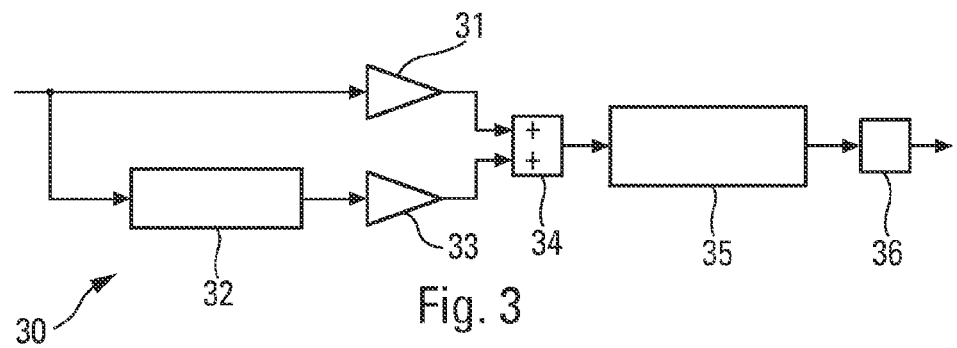
FIG. 3 is a schematic illustration of a model illustrating the behavior of a pilot.

The model 30 comprises, as illustrated in FIG. 3:

an element 31 for multiplying the input value (that is to say, the deviation angle $\Delta\Theta$) by the direct gain Kg;

an element 32 for applying to this input value a filter $F1(s)$ of the type $(0.2s^2+s)/(0.01s^2+0.2s+1)$, s being the Laplace complex variable;

an element 33 for multiplying the output of the element 32 by the derived gain Kr;

an element 34 for adding the outputs of the elements 31 and 33;

an element 35 for applying to this sum a filter $F2(s)$ of the type $1/(0.0156s^2+0.15s+1)$; and an element 36 for limiting where applicable the result received from the element 35 in order to obtain the deflection angle $\delta q$.

Figure 4:
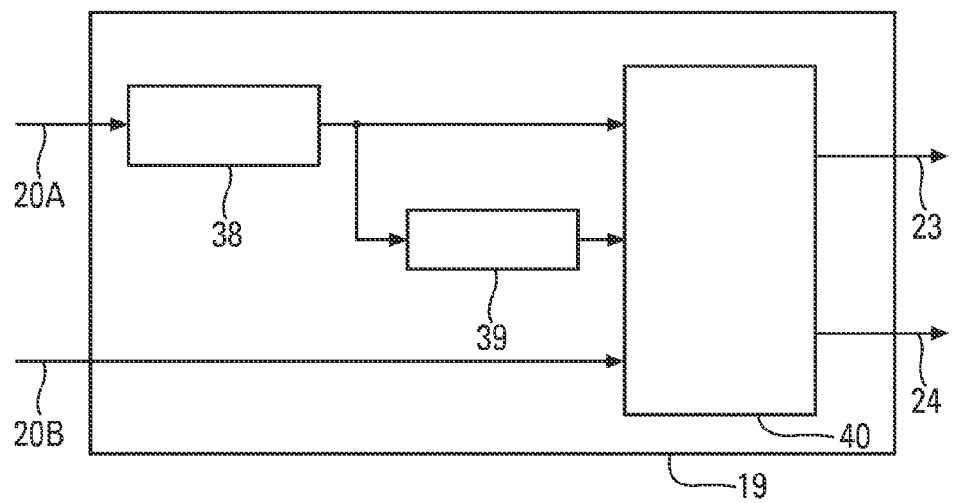
FIGS. 4 and 5 are synoptic diagrams of calculation means of the calculation unit of FIG. 2.

In order to estimate in real time the auxiliary gains Kg and Kr, the estimation unit 19 comprises, as illustrated in FIG. 4:

a processing element 38 for applying the filter $F1(s)$ mentioned above to the value (that is to say, the deviation angle $\Delta\Theta$) received via the connection 20A;

a processing element 39 for applying the above-mentioned filter $F2(s)$ to the result available at the output of the processing element 38; and a processing element 40 for using the results of the processing elements 38 and 39, and the value (that is to say, the deflection angle $\delta q$) received via the connection 20B. The processing element 40 implements a Least Squares method, on these data, which allows it to obtain the gains Kg and Kr which illustrate the behavior of the pilot in real time.

Figure 5:
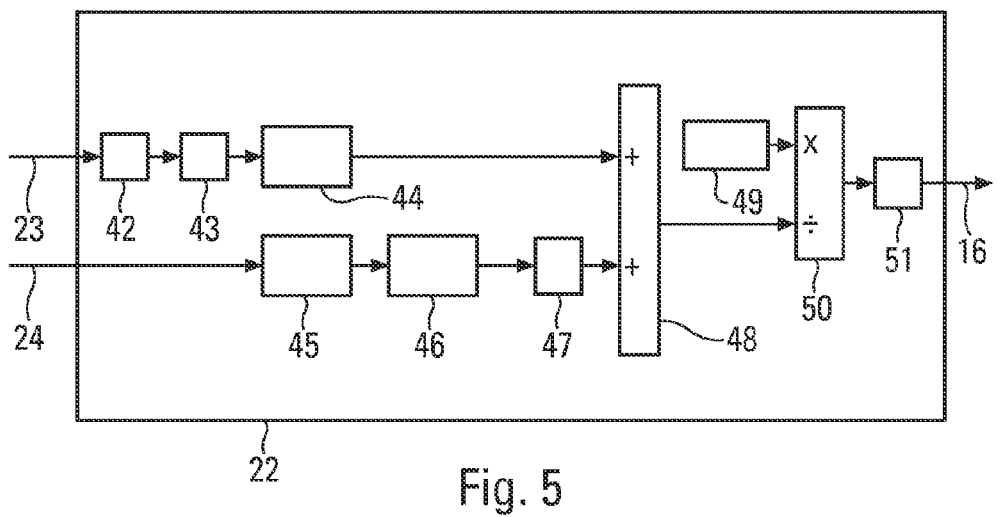

Furthermore, the calculation element 22 comprises, as illustrated in FIG. 5:

a processing element 42 which calculates the absolute value of the value (gain Kg estimated by the unit 19) received via the connection 23;

a processing element 43 which limits where applicable the result provided by the processing element 42;

a processing element 44 which applies to the result provided by the processing element 43 a filter $F3(s)$ of the type $1/(t1\cdot s+1)$, s being the Laplace complex variable and T1 a time constant;

a processing element 45 which applies the same filter $F3(s)$ to the value (gain Kr estimated by the unit 19) received via the connection 24;

a processing element 46 which applies to the result provided by the processing element 45 a filter $F4(s)$ of the type $(T2\cdot s)/(T2\cdot s+1)$, T2 being a time constant;

a processing element 47 which divides by two the result provided by the processing element 46;

a processing element 48 which adds the results provided by the processing elements 44 and 47;

a processing element 50 which divides an adjustment gain which is dependent on the air speed (or corrected speed) of the CAS type, received from a processing element 49, by the result provided by the processing element 48; and a processing element 51 which limits, where applicable, the result provided by the processing element 50 and which provides at the output the corrective term CD.

The device 1 therefore carries out an adaptation in real time of a direct gain KD of the pitch law in order to optimize the adjustment with respect to the pilot who effectively pilots the aircraft. To this end, he carries out:

an estimation in real time of the pilot gains (auxiliary gains Kg and Kr) based on a mathematical model of the pilot; and a correction of the direct gain of the current pitch law, based on the estimated pilot gains, so that the gains of the pitch law are excellently adapted to the manual piloting and the response of the aircraft to the actions of the control handle 11 by the pilot remains very close to that which an automatic pilot system would carry out if it were engaged in spite of the great variety of possible behaviors of the pilot.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for displaying in real time a pitch instruction on an aircraft during piloting of the aircraft in manual mode, the method comprising the steps:

calculating a pitch steering order which is referred to as a pitch order, from a value dependent on an estimated load factor of the aircraft and a load factor order, to which value a gain is applied; and displaying, on a screen of the cockpit of the aircraft, a pitch bar which illustrates the pitch order, acquiring, in real time, a deviation angle of the pitch bar and a corresponding deflection angle of a pitch control handle which is activated manually by a pilot and which illustrates the operating dynamic of the pilot;

calculating a corrective coefficient using the deviation and deflection angles; and calculating a corrected direct gain based on the corrective coefficient multiplied by a direct gain, the corrected direct gain being used at a first calculation step in order to calculate the pitch order used for the display of the pitch bar.

2. The method according to claim 1, wherein a second calculation step comprises:

a first sub-step of estimating two auxiliary gains, illustrating the operating dynamic of the pilot, the two auxiliary gains being estimated using the deviation angle of the pitch bar and the corresponding deflection angle of the pitch control handle activated manually by the pilot; and a second sub-step of calculating the corrective coefficient using the auxiliary gains.

3. The method according to claim 2, wherein the auxiliary gains are such that, by applying them to a deviation angle of the pitch bar in accordance with a mathematical model of the behavior of the pilot, the corresponding deflection angle of the pitch control handle is obtained.

4. The method according to claim 2, wherein the first sub-step comprises the implementation of a Least Squares method.

5. The method according to claim 2, wherein the second sub-step comprises operations involving:

determining a first term by applying processing operations to a first of the auxiliary gains;

determining a second term by applying processing operations to the second of the auxiliary gains;

calculating a sum of the first and second terms; and applying an adjustable gain to this sum and, where applicable, limiting the corresponding value, in order to finally obtain the corrective term.

6. An aircraft, comprising:

a flight director including:
a processing device having:
a first calculation unit which is configured to calculate a pitch steering order, referred to as a pitch order, from a value which is dependent on an estimated load factor of the aircraft and a load factor order, to which value a gain is applied; and
a display unit which is configured to display, on a screen of the cockpit of the aircraft, a pitch bar which illustrates the pitch order,
an acquisition unit which is configured to acquire, in real time, a deviation angle of the pitch bar and a corresponding deflection angle of a pitch control handle which is activated manually by a pilot, illustrating the operating dynamic of the pilot;
a second calculation unit which is configured to calculate a corrective coefficient using the deviation and deflection angles; and
a third calculation unit which is configured to calculate a corrected direct gain which is corrected on the basis of the corrective coefficient multiplied by a direct gain, the corrected direct gain being used by the first calculation unit in order to calculate the pitch order used to display the pitch bar.

7. A processing device for displaying in real time a pitch instruction on an aircraft during piloting of the aircraft in manual mode, the device comprising:

a first calculation unit which is configured to calculate a pitch steering order, referred to as a pitch order, from a value which is dependent on an estimated load factor of the aircraft and a load factor order, to which value a gain is applied; and a display unit which is configured to display, on a screen of the cockpit of the aircraft, a pitch bar which illustrates the pitch order, an acquisition unit which is configured to acquire, in real time, a deviation angle of the pitch bar and a corresponding deflection angle of a pitch control handle which is activated manually by a pilot, illustrating the operating dynamic of the pilot;

a second calculation unit which is configured to calculate a corrective coefficient using the deviation and deflection angles; and a third calculation unit which is configured to calculate a corrected direct gain which is corrected on the basis of the corrective coefficient multiplied by a direct gain, the corrected direct gain being used by the first calculation unit in order to calculate the pitch order used to display the pitch bar.

8. A flight director of an aircraft, comprising:

a processing device having:
a first calculation unit which is configured to calculate a pitch steering order, referred to as a pitch order, from a value which is dependent on an estimated load factor of the aircraft and a load factor order, to which value a gain is applied; and
a display unit which is configured to display, on a screen of the cockpit of the aircraft, a pitch bar which illustrates the pitch order,
an acquisition unit which is configured to acquire, in real time, a deviation angle of the pitch bar and a corresponding deflection angle of a pitch control handle which is activated manually by a pilot, illustrating the operating dynamic of the pilot;
a second calculation unit which is configured to calculate a corrective coefficient using the deviation and deflection angles; and
a third calculation unit which is configured to calculate a corrected direct gain which is corrected on the basis of the corrective coefficient multiplied by a direct gain, the corrected direct gain being used by the first calculation unit in order to calculate the pitch order used to display the pitch bar.

9. An aircraft, comprising:

a processing device having:
a first calculation unit which is configured to calculate a pitch steering order, referred to as a pitch order, from a value which is dependent on an estimated load factor of the aircraft and a load factor order, to which value a gain is applied; and
a display unit which is configured to display, on a screen of the cockpit of the aircraft, a pitch bar which illustrates the pitch order,
an acquisition unit which is configured to acquire, in real time, a deviation angle of the pitch bar and a corresponding deflection angle of a pitch control handle which is activated manually by a pilot, illustrating the operating dynamic of the pilot;
a second calculation unit which is configured to calculate a corrective coefficient using the deviation and deflection angles; and a third calculation unit which is configured to calculate a corrected direct gain which is corrected on the basis of the corrective coefficient multiplied by a direct gain, the corrected direct gain being used by the first calculation unit in order to calculate the pitch order used to display the pitch bar.

* * * * *